United States Patent [19]
Casebolt

[11] Patent Number: 5,355,149
[45] Date of Patent: Oct. 11, 1994

[54] SCANNING SYSTEM FOR TOUCH SCREEN KEYBOARDS

[75] Inventor: Mark W. Casebolt, Seattle, Wash.

[73] Assignee: SpaceLabs Medical, Inc., Redmond, Wash.

[21] Appl. No.: 889,780

[22] Filed: May 27, 1992

[51] Int. Cl.$^5$ .............................................. G09G 3/02
[52] U.S. Cl. .................................... 345/175; 250/221; 341/31
[58] Field of Search ............... 340/712, 706; 250/221; 341/31; 178/18; 345/175, 173, 178

[56] References Cited

U.S. PATENT DOCUMENTS

| | | | |
|---|---|---|---|
| 4,057,325 | 11/1977 | Kondo | 340/784 |
| 4,707,689 | 11/1987 | DiPiazza et al. | 340/712 |
| 4,855,590 | 8/1989 | Bures et al. | 340/712 |
| 4,893,120 | 1/1990 | Doering et al. | 340/712 |
| 4,904,857 | 2/1990 | Ando et al. | 340/712 |
| 4,943,806 | 7/1990 | Masters et al. | 340/712 |
| 4,988,983 | 1/1991 | Wehrer | 340/712 |
| 5,053,757 | 10/1991 | Meadows | 340/712 |
| 5,164,714 | 11/1992 | Wehrer | 340/712 |
| 5,179,369 | 1/1993 | Person et al. | 340/712 |

Primary Examiner—Tommy P. Chin
Assistant Examiner—A. Au
Attorney, Agent, or Firm—Seed and Berry

[57] ABSTRACT

A touch screen control system having a plurality of light emitter and detector pairs positioned on opposite sides of a touch screen display. The emitters and detectors are controlled by a microprocessor-based control system that energizes each of the light emitters in a pseudorandom manner. Before each light emitter is energized, the intensity of ambient light is measured by its associated light detector, and the ambient temperature is also measured by a temperature sensor. The intensity at which the light emitter is then energized is controlled as a function of ambient light and temperature. The control system generates a bitmap identifying beams from each light emitter to its associated detector that are obscured during each of several scans of the light emitter/detector pairs. In order to reject false receptions of light from an obscured light emitter beam, the control system processes the bitmap through a predetermined voting procedure. The control system is thus able to minimize the effect of interfering light sources on the performance of the touch screen.

19 Claims, 16 Drawing Sheets

SCANNING SYSTEM FOR TOUCH SCREEN KEYBOARDS

FIELD OF THE INVENTION

This invention relates to touch screen keyboards, and more particular to a system for accurately scanning touch screen keyboards in the presence of a ambient light interference.

BACKGROUND ART

Touch screen keyboards are commonly used in a wide variety of fields. Touch screen keyboards are generally used with a cathode-ray tube (CRT) display in which rows of light emitters are positioned along two edges of the CRT display and rows of light detectors are positioned along the remaining two edges of the CRT display opposite respective light emitters. Designations corresponding to keyboard functions are then displayed on the CRT while each light emitter is selectively energized. As each light emitter is energized, the associated light detector is sampled to determine if light from the emitter is being blocked from reaching the detector. A keyboard function is selected by touching the corresponding designation thereby blocking light from being coupled from a light emitter to the associated light detector. The position of a finger, pointer or the like is detected in the x and y axis by scanning the light emitter/detector pairs along both the x and y axis.

Conventional touch screen keyboard systems must address several problems in order to perform satisfactorily. Typically, touch screen systems rely upon common emitter and detector amplifier electronics, requiring each emitter/detector pair to be matched to within a narrow margin so as to present uniform operating characteristics and thus reliable beam break detection. Further, a light detector may mistake an ambient light source as emanating from its associated light emitter. Under these circumstances, the touch screen keyboard system will be unable to detect the selection of a key. The effects of ambient light can be reduced by modulating the signal applied to the light emitters and then either filtering or synchronously demodulating the signal from the associated light detector. While these conventional techniques are usually adequate to reject most types of ambient light interference, they are often unable to reject interfering light generated by other touch screen keyboards or other frequency modulated devices operating in the vicinity since the interfering light will have the same or similar spectral content as the light generated by the light emitters. Also, the use of a filter to reject ambient light interference can adversely effect the response time of the touch screen keyboard. A narrow band filter needed to adequately reject ambient light require a long excitation period (ring up time) before the filtered signal from the detector can respond to the modulated light generated by the associated light emitter. As a result, the use of narrow band filters necessitates a relatively slow scanning speed.

Another problem associated with conventional touch screen displays is the varying sensitivity of the light detectors depending upon the intensity of ambient light. Most detectors used in touch screen keyboards are phototransistors. Phototransistors have the characteristic of variable gain depending upon the level of ambient light. In order to compensate for these variations in detector gain, touch screen keyboard systems generally overdrive the light emitters so that sufficient light will reach the phototransistors under worse case conditions. Also, the gain of conventional light detectors, as well as light emitters, may also be affected by temperature. Overdriving the emitters can produce serious problems when the detector gain is not in its worse case condition. Under these circumstances, sufficient light from the emitters may be reflected from adjacent surfaces, such as the screen or detector/emitter mounting structure, that the light detector will be incapable of detecting a break in the direct light path from the emitter to the associated detector. Under these circumstances, the touch screen will be unable to detect the selection of a keyboard function. In addition, variations in the electrical properties of the emitters or detectors, dust on the emitter and/or detector surfaces, and mounting misalignments may also effect the coupling of light from the light emitter to the associated light detector.

There is therefore a need for a touch screen display scanning system that is capable of rejecting ambient light interference without overdriving the light emitters.

DISCLOSURE OF THE INVENTION

It is an object of the invention to provide a scanning system for a touch screen keyboard that is insensitive to ambient light interference even from touch screen displays having identical scan patterns.

It is another object of the invention to provide a touch screen display that does not require close matching of the electrical characteristics of components, such as light emitters and detectors, in order to provide uniform performance.

It is another object of the invention to provide a touch screen display that compensates for the effect of changes in ambient light, temperature, component aging and environmental variations without overdriving the light emitters.

It is still another object of the invention to provide a touch screen keyboard that is less sensitive to reflections of emitted beams from touch screen components.

It is a further object of the invention to provide a touch screen keyboard capable of being rapidly scanned.

It is a still further object of the invention to provide a touch screen keyboard having relatively high resolution.

These and other objects of the present invention are provided a touch screen keyboard system having a plurality of spaced apart light emitters positioned along at least one edge of a display panel and a plurality of spaced apart light detectors positioned along an edge of the display panel opposite the light emitters. The light emitters are selectively energized and, while each light emitter is energized, a corresponding light detector is sampled to determine whether light from the energized light emitter is being received by the enabled light detector. The light emitters are preferably energized in a pseudo-random manner to reduce the probability that a plurality of touch screen systems operating in close proximity will operate in synchronism with each other and thus cause interference. In order to minimize the effects of variations in ambient light and temperature, ambient light and temperature are measured and used to control the power applied to each light emitter so that the intensity of the light generated by the light emitters is a function of the intensity of ambient light and temperature. In order to further reduce the sensitivity of the touch screen keyboard to interference, the touch screen keyboard is scanned a plurality of times before a touch screen key is considered to be selected. More specifically, during each scan, the locations of obscured light beams are detected and recorded in a table. After a plurality of scans, the table is examined and the presence of a key selection is indicated by a light beam being obscured during a predetermined number or predetermined percentage of scans. As a result, the touch screen keyboard is relatively insensitive to random noise sources.

BEST MODE FOR CARRYING OUT THE INVENTION

Figure 1:
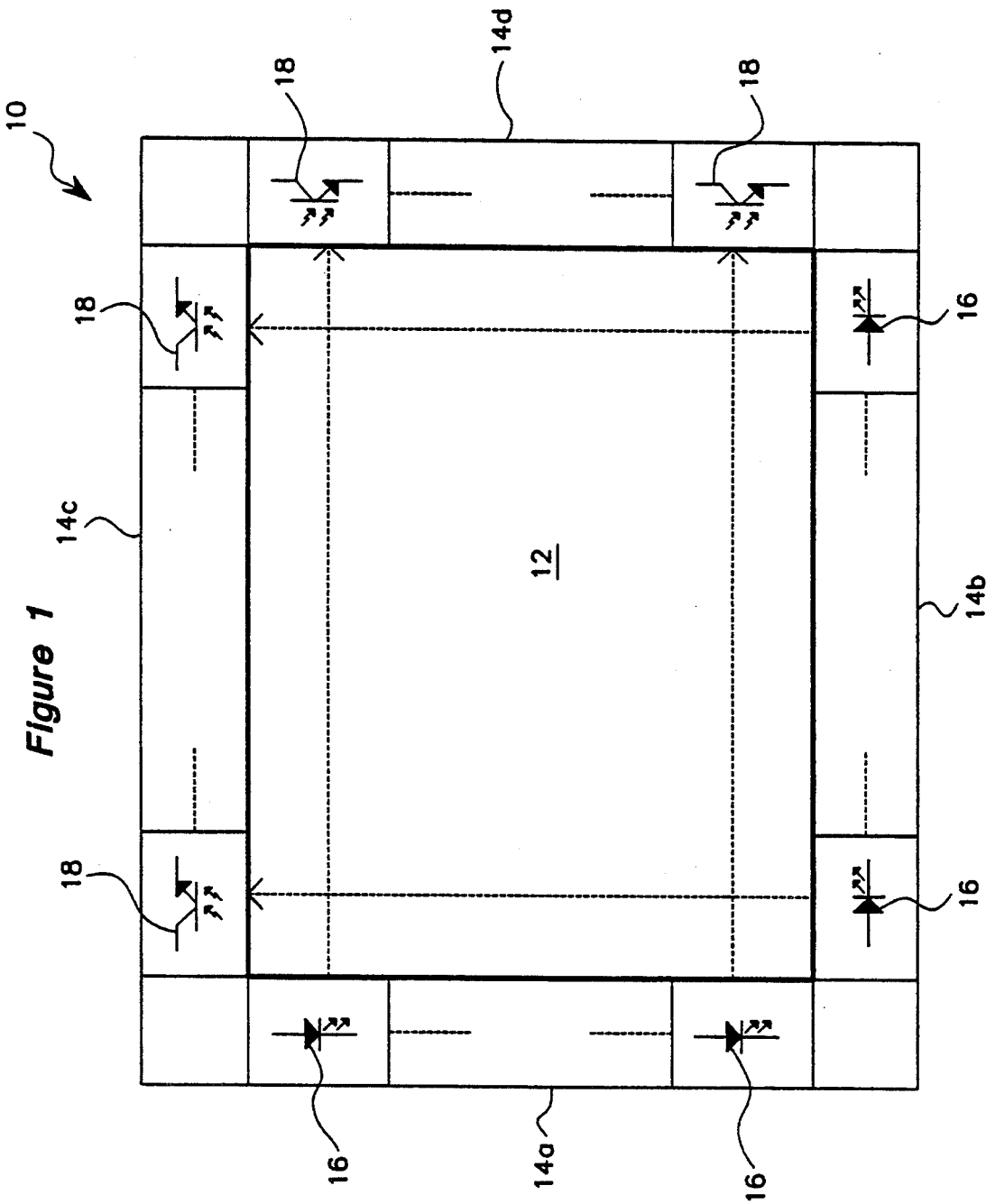
FIG. 1 is a mechanical schematic showing one embodiment of a touch screen keyboard.

A preferred embodiment of the inventive touch screen keyboard is illustrated in schematic form in FIG. 1. As with conventional touch screen displays, the preferred embodiment of the touch screen board 10 uses a rectangular CRT display screen 12 surrounded by a bezel 14. A plurality of equally spaced light emitters 16 are mounted along the left edge bezel 14a. Similarly, a plurality of spaced apart light emitters 16 are mounted in the lower bezel 14b. Although the number of light emitters 16 used will depend upon the desired resolution of the touch screen keyboard, in the preferred embodiment thirty-two light emitters 16 are mounted in each bezel 14a,b.

Regardless of the number of light emitters 16 used, a plurality of light detectors 18 corresponding in number and position to the light emitters 16 on the opposite bezel are mounted in the bezels 14c,d along the remaining edges of the screen 12. As is well known in the art, the light emitters 16 are selectively energized during which time the light detectors 18 mounted in the corresponding positions in the opposite bezel are individually sampled. If the light path from each light emitter 16 to the corresponding light detector 18 is not obscured, the light generated by the light emitter 16 generates a signal at the light detector 18. If, however, a finger, pointer or other object is placed on the screen 12 over a displayed key positioned along the light path, the emitted light is obscured and thus does not reach the detector 18. By scanning along the x-axis using the light emitters 16 in the bezel 14b and along the y-axis using the light emitters 16 in the bezel 14a, the exact position of the selected key can be determined.

In the preferred embodiment illustrated in FIG. 1, the light detectors 18 are phototransistors. These phototransistors 18 used in the preferred embodiment and in conventional touch screen keyboards have gain characteristics that are affected by ambient light and temperature. In order to minimize the effects of variations in ambient light and temperature, the emitters 16 are typically driven at a level that is high enough to be sensed by the light detectors 18 under worst case, low gain conditions. However, when the light detectors 18 are not operating under their worst case, low gain conditions, sufficient light from the light emitters 16 can be reflected from adjacent surfaces to the associated light detector 18. Under these circumstances, the touch screen keyboard will fail to detect the selection of a key on the screen 12.

Figure 2:
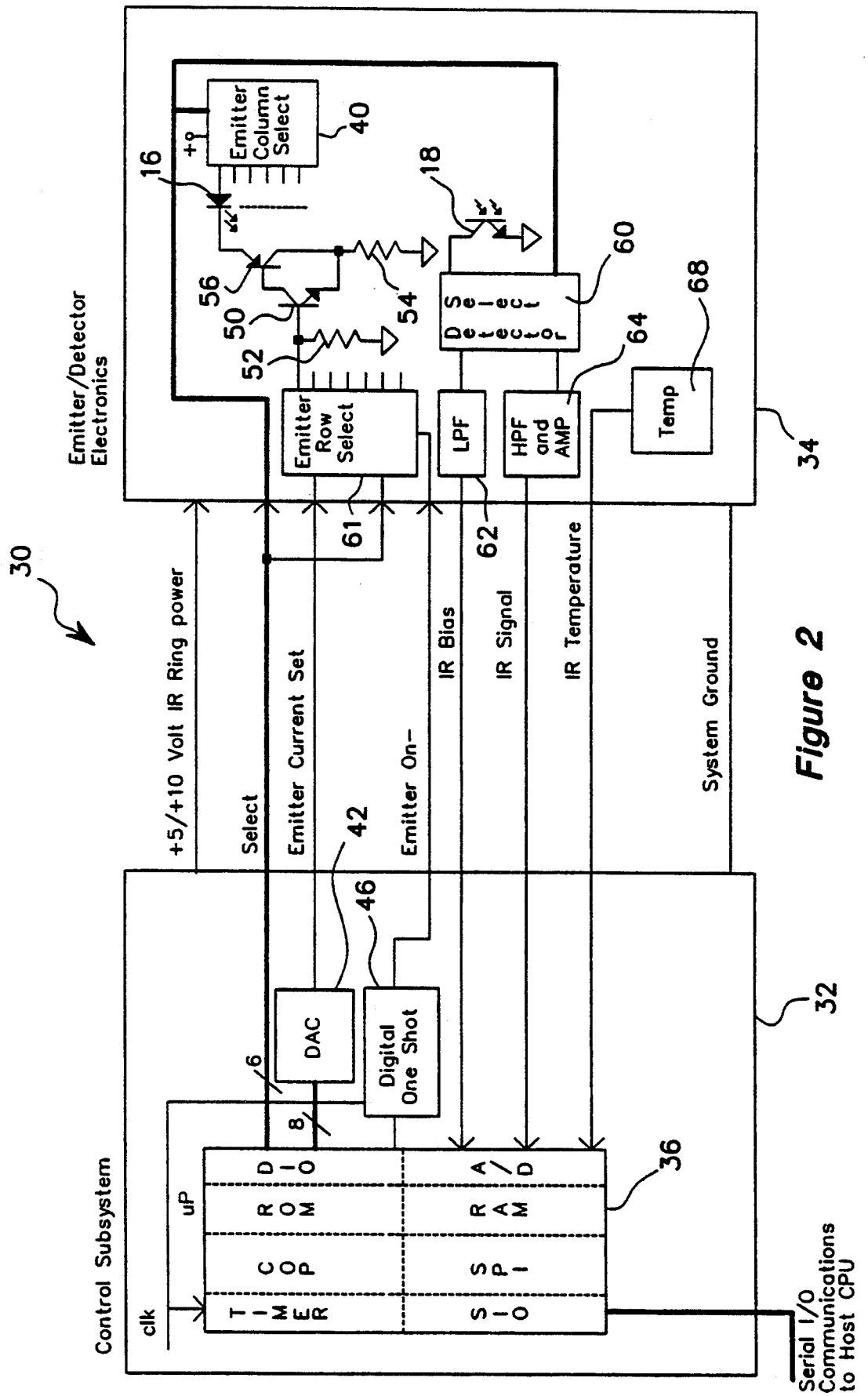
FIG. 2 is a system block diagram of the inventive touch screen keyboard system.

A preferred embodiment of a system for scanning the light emitters 16 and detectors 18 in the embodiment of FIG. 1 is illustrated in FIG. 2. The system 30 includes a control subsystem 32 and an emitter/detector subsystem 34. The control subsystem 32 includes a microprocessor 36 of conventional design which, as is well known in the art, includes an internal timer circuit, read-only memory (ROM) for storing program instructions, digital input/output ports, analog input ports connected to an internal analog-to-digital convertor, random access memory (RAM) and a serial input/output port. The microprocessor 36 receives a clock signal generated in a conventional manner to control the operation and timing of the microprocessor 36. The microprocessor 36 operates in accordance with a program of instructions which are explained in detail below.

The emitter/detector electronics 34 include an emitter column selector 40 implemented by a conventional multiplexer and discrete power transistors, as well as an emitter row selector 62 implemented by a conventional multiplexer. The emitter column selector 40 applies power to the anode of a light emitting diode 16 designated by three bits of a six bit "Select" word when enabled by the "Emitter On-" signal. The six bit "Select" word is received from a digital I/O port of the microprocessor 36. The "Emitter On-" signal is generated by the digital one-shot 46.

An analog "Emitter Current Set" signal is generated by a digital-to-analog converter 42 in the control subsystem 32. The digital-to-analog converter 42 is, in turn, controlled by 8 bits of data from digital I/O ports of the microprocessor 36. The "Emitter Current Set" signal is directed by the emitter row selector 62 to a voltage to current converter consisting of resistors 52 and 54 and transistors 50 and 56. As with the emitter column selector 40 above, the emitter row selector 62 designates the voltage-to-current converter via the remaining three bits of the six bit "Select" word when enabled by the "Emitter On-" signal. The six bit "Select" word is received from a digital I/O port of the microprocessor 36.

When directed by the emitter row selector 62, the "Emitter Current Set" signal is applied to the base of a transistor 50 which is normally biased at ground through resistor 52. The energized transistor 50 conducts current from the base of PNP transistor 56, causing a larger current to flow from the cathode of light emitting diode 16 to resistor 54. Subsequent current flow through resistor 54 generates a voltage which is substantially limited to the "Emitter Current Set" voltage.

Luminous intensity generated by light emitter 16 is directly proportional to the amount of current flow through the device. The "Emitter Current Set" signal thus acts as a light emitter intensity control signal. The period of time that the light emitter 16 is illuminated is controlled by the duration of the "Emitter On-" signal generated by the digital one-shot 46.

FIG. 2 shows a single light emitter 16 in control system 30. However, in the preferred embodiment illustrated in FIG. 1, 64 light emitters 16 are used. The 64 light emitters are organized as an eight-by-eight cross bar switch. Emitter column selector 40 relies upon the three low order bits of the six bit "Select" word to designate one of eight possible columns of eight light emitter 16 anodes. Emitter row selector 62 relies upon the three high order bits of the six bit "Select" word to designate one of eight possible rows of eight light emitter 16 cathodes. Emitter row selector 62 and emitter column selector 40 are energized simultaneously via "Emitter On-" signal. For any value of the six bit "Select" word, emitter row selector 62 and emitter column selector 40 may intersect at only one light emitter 16.

Thus the six bit "Select" word individually selects one of sixty-four possible light emitters 16. "Emitter Current Set" controls light intensity radiated from that individual light emitter 16 which is energized for a fixed short period of time by the "Emitter On-" signal. Current applied to the light emitter 16 and its resulting light intensity are fully adjustable over a range which far exceeds the steady state current rating for the light emitter 16. The extremely short "Emitter On" signal generated by the digital one-shot 46 and low device activation duty cycle allow such excess currents and their resulting increased light intensity without degradation to the light emitter 16. This increased light intensity provides a higher signal level than would be available using conventional touch techniques.

The collector of a correspondingly positioned phototransistor 18 is connected by a detector selector 60 to a low pass filter 62 and to a high pass filter and amplifier 64. The same "Select" which designated light emitter 16 also designated its corresponding phototransistor 18. Phototransistor 18, however, is enabled only by the "Select" word, and so is active before and after the light pulse of light emitter 16 occurs.

Figure 3:
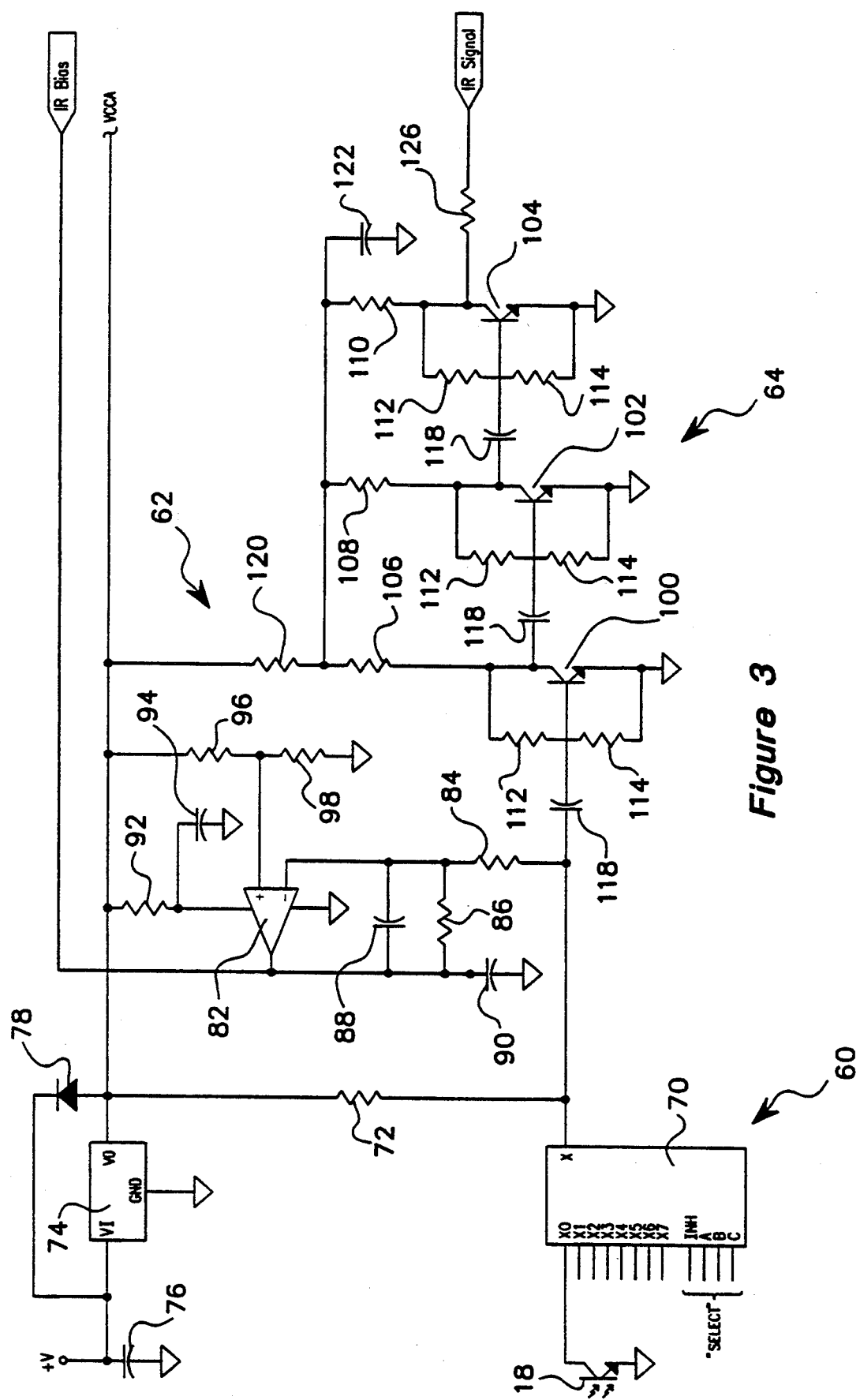
FIG. 3 is a schematic of a high pass filter and amplifier circuit receiving signals generated by the light detectors and an ambient bias circuit for providing a signal indicative of ambient light, both of which are used in the system of FIG. 2.

The collector of the phototransistor light detector 18 is connected to one of several inputs to conventional multiplexer 70. The "Select" word and associated decoding cause the phototransistor light detector 18 to be applied to the output of multiplexer 70. Although a single multiplexer 70 connected to eight light detectors 18 is shown in FIG. 3, it will be understood that a total of 64 light detectors 18 are used in the preferred embodiment of FIG. 1. For any value of the six bit "Select" word, only one light detector 18 associated with its physical counterpart light emitter 16 is applied to the high pass filter and amplifier 64 and low pass filter 62. Additional multiplexers 70 are selectively enabled via decoding of the three high order bits of the six bit "Select" word. The three low order bits are decoded directly by each multiplexer 70 via the A, B, C input to the multiplexers 70.

The output of the multiplexer 70 is biased through resistor 72 by a supply voltage VCCA generated by a conventional voltage regulator 74. Voltage regulator 74 is, in turn, powered by the system power supply which is filtered by capacitor 76. Voltage regulator 74 provides isolation and supply stability for the high fixed gain amplifier and high pass filter 64 detailed in FIG. 3. Clamping diode 78 is provided to protect voltage regulator 74 from damage caused by a polarity reversal due to a loss of the system power supply voltage.

Ambient light striking phototransistor light detector 18 causes a current to flow from "VCCA" through resistor 72 and multiplexer 70 into its collector. Voltage drop across resistor 72 provides a signal at the output of multiplexer 70. Because of the low pass characteristics of the low pass filter 62, it does not respond to the pulse of light from the light emitter 16. Instead, it provides a signal indicative of the level of ambient light as measured by the phototransistor 18. In this manner, the output of the low pass filter 62 will be a function of not only the level of ambient light, but also the gain of the phototransistor 18. The ambient light signal output by the low pass filter 62 is applied to an analog input port of the microprocessor 36.

The high frequency characteristics of the high pass filter and amplifier 64 allow it to respond to the pulse of light from the light emitter 16. Accordingly, if the light path from the light emitter 16 to the light detector 18 is not obscured, a signal pulse will be generated at the output of the high pass filter and amplifier 64 each time the light emitter 16 is energized. The signal pulse is applied to an analog input port of the microprocessor 36 to allow the microprocessor 36 to determine that none of the keys positioned along the path from the light emitter 16 to the light detector 18 is being selected.

Finally, the emitter/detector subsystem 34 includes a conventional temperature sensor 68 which outputs a signal indicative of ambient temperature. This ambient temperature signal is also applied to an analog input of the microprocessor 36 so that the microprocessor 36 can adjust the intensity control signal as a function of both temperature and ambient light. Once the microprocessor 36 determines the location of a selected key, it outputs this information to a host computer through a serial I/O port so that the computer can identify and implement the selected key function.

The high pass filter and amplifier 64 forming part of the emitter/detector subsystem 34, is illustrated in greater detail in FIG. 3. The collector of the phototransistor light detector 18 is applied to one of several inputs to conventional multiplexer 70. When the multiplexer 70 is enabled by the six bit "Select" word, it applies one of the inputs to its output. The output of the multiplexer 70 is generally a signal consisting of a direct current (DC) offset indicative of ambient light striking the phototransistor. A pulse, corresponding to an energized light emitter, is present only when light detector 18 is not blocked by an object from receiving its associated light emitter output. Although a single multiplexer 70 connected to eight light detectors 18 is shown in FIG. 3, it will be understood that a total of eight multiplexers 70 are provided for the 64 light detectors 18 used in the preferred embodiment of FIG. 1. These additional multiplexers 70 are selectively enabled by higher order bits of the eight bit "Select" word from the multiplexer which are applied to the A,B,C input of the multiplexers 70.

The output of the multiplexer 70 is biased through resistor 72 by a supply voltage VCCA generated by a conventional voltage regulator 74. The voltage regulator 74 is, in turn, powered by the system power supply which is filtered by capacitor 76. Clamping diode 78 is provided to prevent the power supply voltage VCCA from being driven by transients significantly above the system power supply voltage. When the multiplexer 70 connects the output to one of the inputs, the associated phototransistor 18 is driven by the voltage regulator 74 through resistor 72.

The signal at the output of the multiplexer 70 is applied to two distinct circuits. The first of these circuits is an ambient light bias circuit 80, which consists of an operational amplifier 82 having a summing resistor 84, and a low pass filter formed by resistor 86 and capacitor 88 connected in parallel to provide negative feedback. Capacitor 90 also limits the high frequency response of the amplifier 82. The amplifier 82 is powered through resistor 92, and this power supply voltage is low pass filtered by capacitor 94. The noninverting input of the operation amplifier 82 is biased to a predetermined value by voltage divider resistors 96, 98. The bias level set by the voltage divider resistors 96, 98, in combination with the gain of the amplifier 82 set by the ratio of feedback resistor 86 to summing resistor 84, scales the voltage indicative of ambient light to within a predetermined operating range. Also, as explained above, the low pass characteristics of the amplifier 82 provided by capacitors 88, 90 prevents the amplifier 82 from responding to light pulses from the associated light emitter 16 so that the output of the amplifier 82 is indicative of ambient light.

The output of the multiplexer 70 is also applied to the high pass filter and amplifier 64 illustrated in FIG. 2. As illustrated in FIG. 3, the high pass filter and amplifier 64 includes three amplifying transistors 100, 102, 104 having respective load resistors 106, 108, 110. The bases of the transistors 100, 102, 104 are each biased by respective voltage divider resistors, 112, 114. Finally, the signal pulses are coupled to the base of each transistor 100-104 by a respective coupling capacitor 118. Power is supplied to the transistors 100-104 through resistor 120 which, in combination with capacitor 122 low pass filters the power supply voltage. A signal pulse corresponding to the pulse of light received by the phototransistor 18 is thus output from the collector of transistor 104 through resistor 126. This pulse is applied to an analog input of the microprocessor 36 as illustrated in FIG. 2.

One of the advantages of the circuitry used in the high pass filter and amplifier 64 is that requires only a single polarity of power supply. It also provides low noise and high gain with little cost and good insensitivity to temperature variations. In contrast, high pass filter amplifiers using operational amplifiers or operating open loop have poor pulse mode responses due to their limited slew rate at high gains. Additionally, judicious selection of passive component values allow 18 dB per octave low pass rejection of the principal contamination sources below 300 Hz. Although high gain, the amplifier is designed with an order of magnitude less sensitivity than are found in common touch screen keyboards. This takes advantage of the much higher luminous signal strength provided by high energy light emitter 16 pulse, and thus ambient light noise is further reduced in the system. High luminous signal strength and low noise contamination are fundamental improvements provided by the invention. Further, the amplifier provides a stable, fixed high gain with low group delay which allows the light emitter 16 pulse period to remain short.

This technique provides a significant advantage over techniques which use a variable gain amplifier and fixed output emitter. In the latter technique, when an emitter/detector pair require additional signal strength to compensate for component variation, both signal and noise are increased via variable gain amplifier. Thus the signal to noise ratio is not improved. Using the invention technique described herein, signal is increased without an accompanying increase in ambient noise, improving signal to noise in the system.

Figure 4:
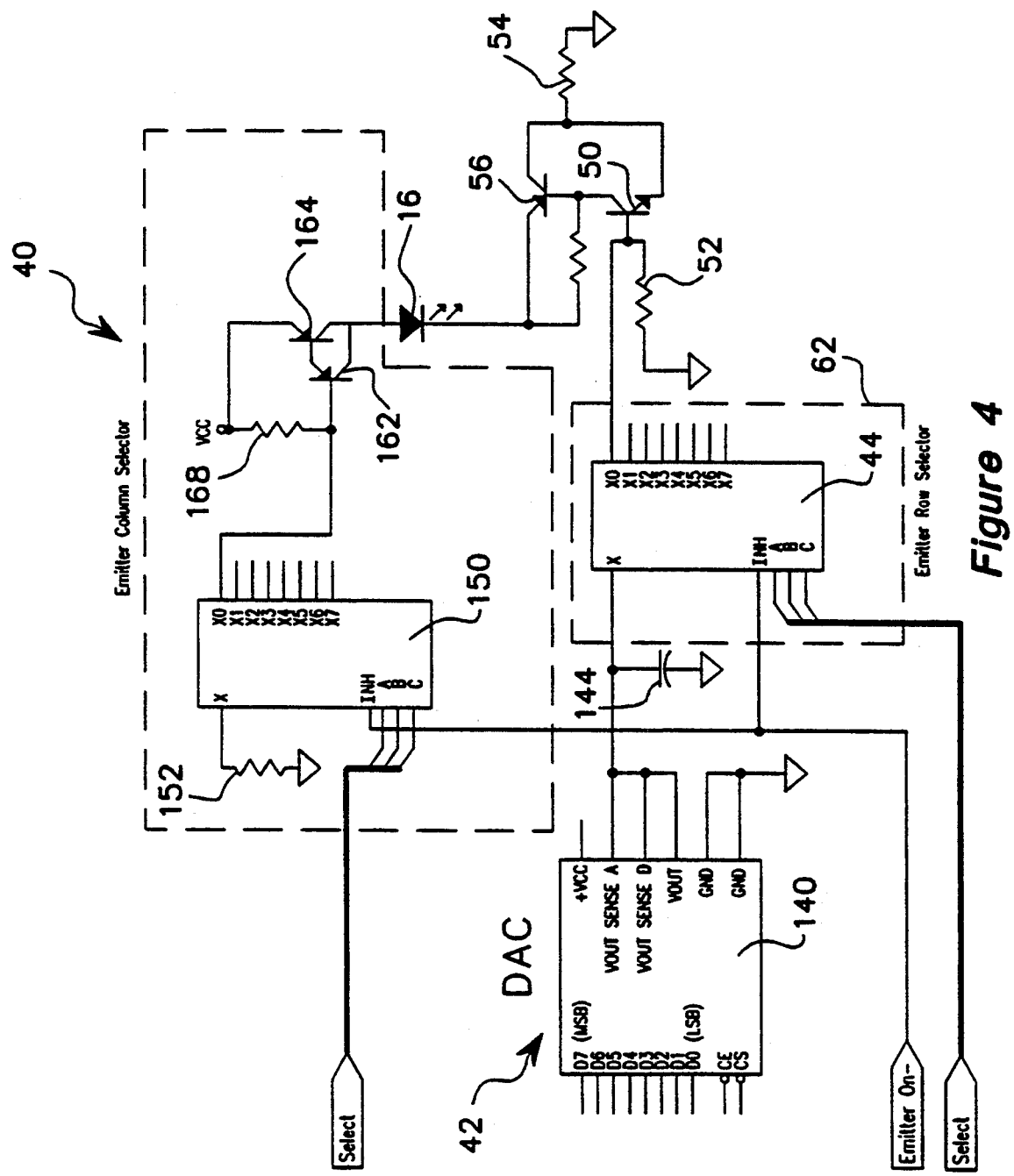
FIG. 4 is a schematic of a circuit used in the system of FIG. 2 for energizing light emitters.

The digital-to-analog converter 42 (FIG. 2), emitter column selector 40, emitter row selector 62, and the remaining emitter drive components 50–56 are shown in combination with light emitter 16 in FIG. 4. The digital-to-analog converter 42 is a conventional integrated circuit digital-to-analog converter having an 8-bit input for receiving a digital word indicative of the analog voltage as well as chip enable and chip select inputs. All of the inputs of the digital-to-analog converter 140 are generated by the microprocessor 36 (FIG. 2). The output of the digital-to-analog converter 140 is an analog voltage corresponding to the value designated by the digital word. This analog voltage is low pass filtered by capacitor 144 and applied to the common terminal of the multiplexer 44, as explained above. As also mentioned above, the "Emitter On" output from the digital one-shot 46 (FIG. 2) controls the duration that the "Emitter Current Set" analog voltage from the D/A converter 140 causes current to flow through the selected light emitter 16.

The emitter column selector 40 includes a conventional multiplexer 150 to which 3 bits of the six bit "Select" word are applied. The multiplexer 150 provides a path to ground through resistor 152 to one of eight I/O outputs selected by the 3-bit word. An inhibit input is enabled by the "Emitter On-" signal. Darlington transistors 162, 164 are normally biased off by resistor 168. When "Emitter On-" is asserted, current flows out of the base of transistor 162, through the multiplexer 150 and resistor to ground. The transistor Darlington pair 162, 164 becomes a saturated switch, applying essentially "VCC" to the anode of light emitter 16. Simultaneously, when the inhibit input of conventional multiplexer 44 is enabled via "Emitter On-" signal, current is conducted from the cathode of light emitter 16 via the voltage-to-current converter consisting of transistors 50, 56 and resistors 52, 54. The voltage-to-current converter is energized via the conventional multiplexer 44 which forms the emitter row selector 62 as previously described.

The supply voltage outputs from the multiplexer 150 are applied to a respective Darlington pair of transistors 162, 164 to switch the power supply voltage to the anode of light emitter 16. The transistors 162, 164 are biased off through resistor 168.

Figure 5:
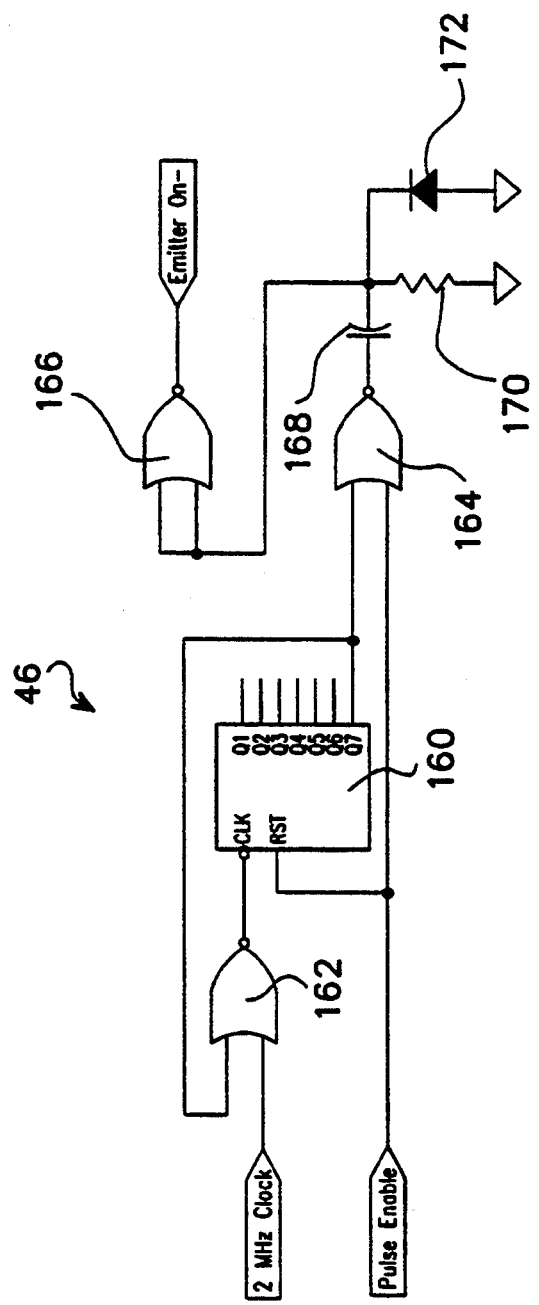
FIG. 5 is a schematic of a digital one-shot used in the system of FIG. 2 to control the duration during which the light emitters are energized.

The remaining circuitry shown in FIG. 2 is the digital one-shot 46 which generates the "Emitter On-" signal for the emitter column selector 40, emitter row detector 61, and detector selector 60. The digital one-shot 46, which is illustrated in FIG. 5, uses a conventional integrated circuit counter 160 having a reset input receiving a pulse enable signal from the microprocessor 36 and a clock signal output by a NOR-gate 162. The NOR-gate 162 in turn receives a two mHz clock from the microprocessor 36 and the Q7 output of the counter 160. When the terminal count of the counter 160 is reached, the logic "1" signal at the Q7 output disables the NOR-gate 162 to prevent the clock signal from reaching the clock input of the counter 160. Under these circumstances, the Q7 output of the counter 160 remains at logic "1" thereby causing NOR-gate 164 to output a logic "0". The output of NOR-gate 164 is applied to a third NOR-gate 166 acting as an inverter through capacitor 168. The input to NORgate 166 is biased low through resistor 170, and it is clamped from being driven substantially below zero volts by diode 172. The digital one-shot circuit is designed to require a pair of actions at the "Pulse Enable" input from the microprocessor 36 in order to activate an emitter light pulse. Fist, "Pulse Enable" goes high, causing a reset of counter 160 and thereby causing the output of Q7 to go low. The output of NOR-gate 164 remains low, however, because the "Pulse Enable" input is now high. Further, counter 160 is held in reset and will not count until "Pulse Enable" is set low. NOR-gate 162, however, is now enabled, allowing the 2 MHz clock to pass through to the clock input of counter 160. The high to low transition of "Pulse Enable" releases the counter 160 and causes a high output from NOR-gate 164 to couple through capacitor 168 to produce a negative going pulse at the NOR-gate 166. When the counter 160 once again reaches the terminal count, the NORgate 162 is disabled as explained above, and the output of the NOR-gate 166 is driven high through NOR-gate 164 and capacitor 168. The negative going pulse at the output of the NORgate 166 controls the duration that the light emitters 16 are illuminated as explained above. Capacitor 168 is provided to insure that the light emitters 16 are not energized indefinitely if, for some reason, the counter 160 or its associated circuitry malfunctions so that the terminal count is not reached. Under these circumstances, capacitor 168 will discharge through resistor 170 thereby once again causing the output of NORgate 166 to go high.

Figure 6:
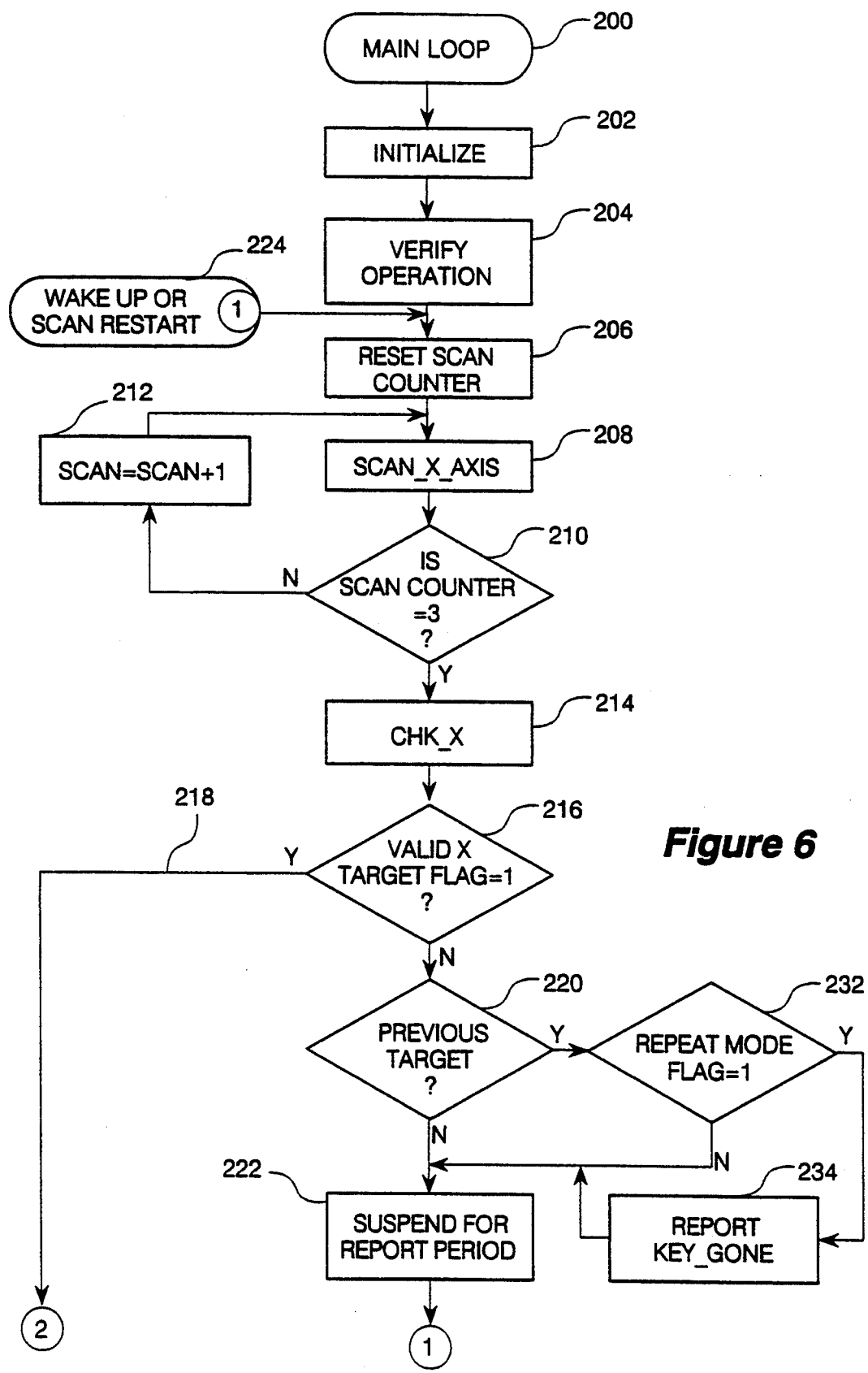
FIG. 6 is a flow chart of the main loop software used in the system of FIG. 2.
Figure 6:
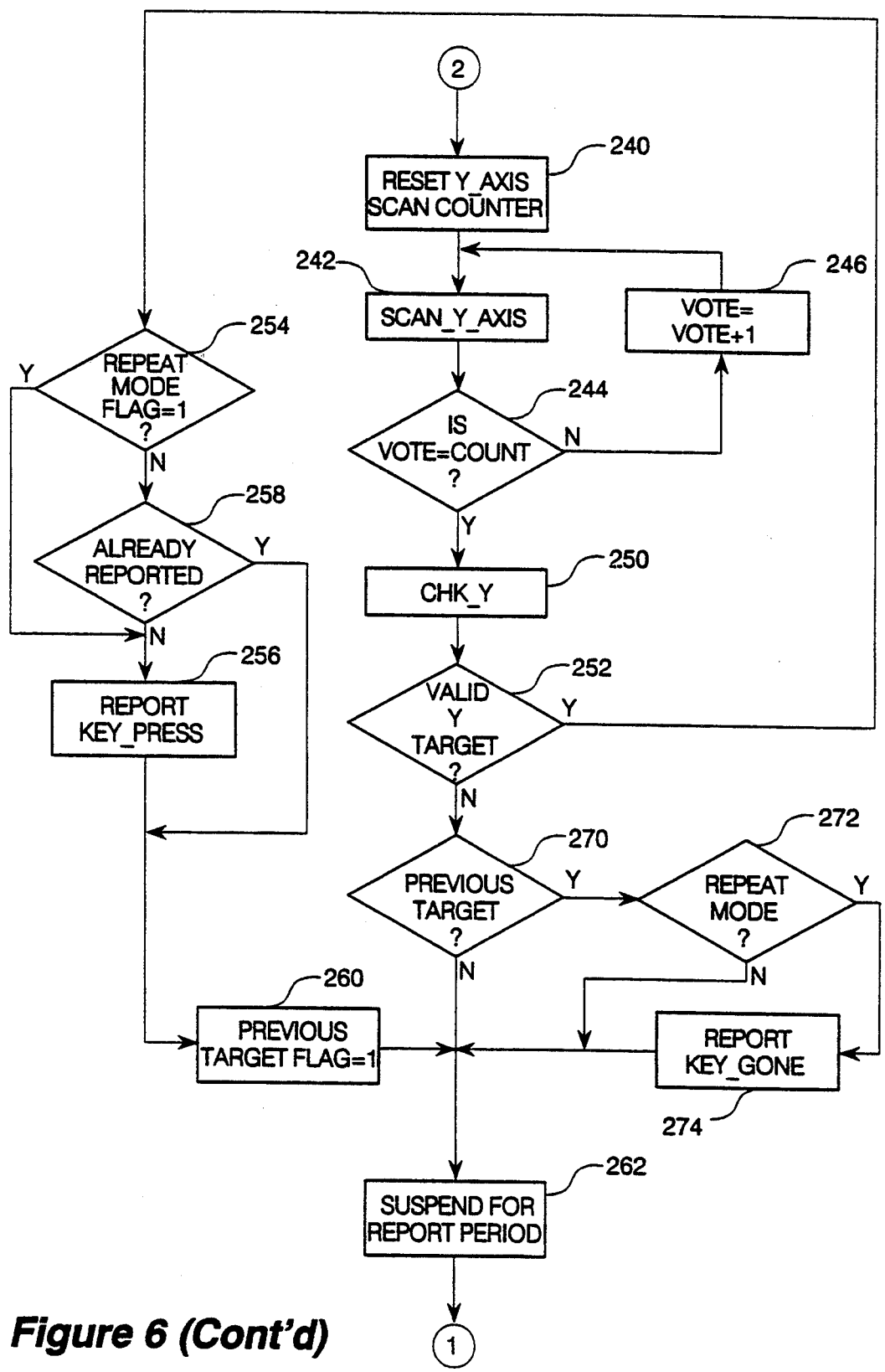

As mentioned above, the microprocessor 36 (FIG. 2) operates in accordance with a program of instructions. Flow charts showing this program are illustrated in FIGS. 6-15. With reference to FIG. 6, the main loop program is entered at 200 and standard initialization functions, such as setting up I/O ports as either inputs or outputs, clearing registers, etc., are performed at 202. The operation of the emitter and detector electronics are then verified at 204 by sequentially illuminating each emitter and detecting receipt of the emitted light at the associated detector. An internal counter in the microprocessor 36 that records the number of keyboard scans is then reset at 206. The main loop program calls a "SCAN X-AXIS" subroutine at 208 to scan the light emitters and detectors positioned along the lower and upper edges, respectively, of the screen 12 (FIG. 1). After all of the x-axis emitters/detectors have been scanned, the program checks at 210 to determine if a predetermined number, e.g., 3, scans of the x-axis have been completed. If not, the scan counter is incremented by one at 212 and the "SCAN X-AXIS" subroutine is once again called at 208.

After a predetermined number of x-axis scans have been completed the main loop branches to 214 where a "CHK X" subroutine is called. As explained in greater detail below, the "CHK X" subroutine examines a record of interrupted light beams from the emitters to associated detectors along the x-axis to determine if the size of the interrupting object is consistent with a finger or other pointer. The purpose of the "CHK X" subroutine is to reject interrupting targets that are either too big (such as interruptions caused by cleaning the screen 12 with a cloth) or too small (such as interruptions produced by a fly). If the subroutine determines at 214 that the interrupting object is the proper size, it sets a "VAILID X TARGET FLAG" to 1.

The main loop program then progresses to 216 where the VALID TARGET FLAG is checked. With the VALID TARGET FLAG is found at 216 to be set to 1, the program branches through path 218 to scan the y-axis emitters/detectors as explained below. However, if the VALID TARGET FLAG is not set to 1, the program branches to 220 to determine if the VALID TARGET FLAG had previously been set to 1 thus indicating that a finger or pointer had been removed from the screen 12. If not, the program waits for a timeout at 222 before returning through 224 to reset the scan counter at 206 and follow the steps described above.

If the main loop program has determined at 216 that the VALID TARGET FLAG is not set to 1 but it determines at 220 that the flag was previously set to 1, the program branches to 230 where a REPEAT MODE FLAG is checked. The REPEAT MODE FLAG is set to 1 by a host computer if it is desired to allow a keyboard function to be continuously designated such as, for example, a constantly depressed spacebar key. If the REPEAT MODE FLAG is not set to 1, thus indicating that the repeat mode is not active, the program branches to 222 to wait for a timeout before returning through 224. If the repeat mode is active, a "REPORT KEY GONE" subroutine is called at 234 to provide an indication that the selected key is no longer being selected.

After a valid target has been detected at 216, the main loop program proceeds via 218 to scan the y-axis emitter/detectors as explained above. A y-axis scan counter internal to the microprocessor 36 is reset at 240 in the same manner that the x-axis scan counter is reset at 208. Thereafter, the y-axis emitter/detectors are scanned at steps 242, 244, 246 in the same manner that the x-axis emitter/detectors are scanned in steps 208, 210, 212, respectively. Similarly, after the y-axis has been scanned a predetermined number of times as the term the 244, a "CHK Y" subroutine is called at 250 which determines if the obscuring target is the proper size in the same manner that the "CHK X" subroutine called at 214 performs that function. The main loop program then determines at 252 if a valid y-axis target is present. If so, the program branches to 254 to check the REPEAT MODE FLAG. If the repeat mode is active, the selected key is reported at 256. Otherwise, the program branches to 258 to determine if the selected key has already been reported. If not, the key is first reported at 256. After the selected key is reported at 256, the PREVIOUS TARGET FLAG is set to 1 at 260 before waiting for a timeout at 262 and eventual return through 224 as explained above. If the main program determines at 258 that the selected key has already been reported, the PREVIOUS TARGET FLAG is set to 1 at 260 without once again reporting the presence of the selected key.

Returning to step 252, if the program determines that a valid "y" target has not been selected, the program branches to 270 to determine if the target was previously selected. If not, the program waits at 262 for a timeout before returning. Otherwise, the program checks at 272 to determine if the repeat mode is active. If the repeat mode is active, the program reports the fact that the selected key is no longer being selected at 274 before waiting for a timeout at 262. If the repeat mode is not found to be active at 272, there is no need to report the absence of the selected key since only the initial actuation of the selected key need be reported. Therefore, the program branches directly from 272 to 262 to await a timeout.

As mentioned above, the first subroutine that is called by the main loop program of FIG. 6 is the "SCAN X-AXIS" subroutine which is called at 208. The SCAN X-AXIS subroutine is illustrated in detail on FIG. 7. The SCAN X-AXIS subroutine is entered at 300 and a "GET IR PAIR" subroutine is called at 302 to energize a specific light emitter and enable a specific light detector. With reference to FIG. 8, the "GET IR PAIR" subroutine 302 is entered at 310 and a system clock counter internal to the microprocessor 36 is sampled at 312. The low order bits of the counter are then masked off at 314 so that only the low order bits are examined. This acts as a pseudo-random number generator for selecting IR pair to be activated. The low order bits are used to identify specific emitter/detector pair. The subroutine determines at 316 whether the emitter/detector pair corresponding to the low order bits have previously been sampled during a given scan. If not, the low order bits are stored in a bitmap at 318 to designate that the corresponding emitter/detector is being sampled. Appropriate outputs from the microprocessor 36 are then enabled at 320 as described during the explanation of the hardware thereby energizing the selected emitter and enabling the selected light detector. The program then returns to the "SCAN X-AXIS" subroutine 208 shown in FIG. 7 via 322. If the "GET IR PAIR" subroutine determines at 316 that a emitter/detector pair corresponding to low order address bits have previously been sampled, the low order address is incremented at 324 and the bitmap is then examined at 326 to determine if all of the emitter/detector pairs have been sampled. If not, the program returns to 316 to repeat the above-described procedure. After all of the emitter/detectors have been sampled, the subroutine returns to the calling subroutine through 322.

Returning, now, to FIG. 7, after the "GET IR PAIR" subroutine has been executed at 302, the subroutine waits a predetermined period for the electronic circuitry to stabilize at 330. The subroutine then calls a "GET BIAS" subroutine at 332. The "GET BIAS" subroutine is illustrated in detail in FIG. 9. The "GET BIAS" subroutine 332 is entered at 340 and the analog-to-digital converter internal to the microprocessor 36 is enabled at 342. The program then waits for a predetermined period at 344 to allow the analog-to-digital converter to perform its acquisition process, and the output of the analog-to-digital converter is saved at 346 before returning through 348. The value saved at 346 is indicative of the intensity of ambient light as measured by the selected light detector.

Returning once again to FIG. 7, the "SCAN X-AXIS" subroutine 208 then calls a "CALC POWER" subroutine at 350. The "CALC POWER" subroutine 350 is shown in detail in FIG. 10. The "CALC POWER" subroutine is entered at 360 and a minimum value of emitter intensity is designated at 362 depending upon the measured value of ambient light. The subroutine then determines at 364 whether the ambient light is below a minimum threshold. If so, a minimum intensity default value is selected and the program branches to 366 where it returns to the "GET X-AXIS" subroutine 208 illustrated in FIG. 7. If the ambient light is below a predetermined minimum value, the subroutine checks if it is above a predetermined maximum value at 368. If so, a maximum power level is set at 370 before returning through 366. If the intensity of the ambient light is somewhere between a predetermined minimum and maximum value, the subroutine branches to 370 where an intensity value corresponding to ambient light is selected in a lookup table. As is well known in the art, a lookup table contains a record of the optimum light emitter intensity for each value of ambient light and it will generally following a non-linear relationship. Once the light intensity is selected at 370, the program branches to 372 to multiple the normalized power value by the value of ambient light as a function of its relationship between the minimum and maximum values. This value is then added to the minimum intensity value at 374 and the result is saved as the desired value at 376.

Figure 7:
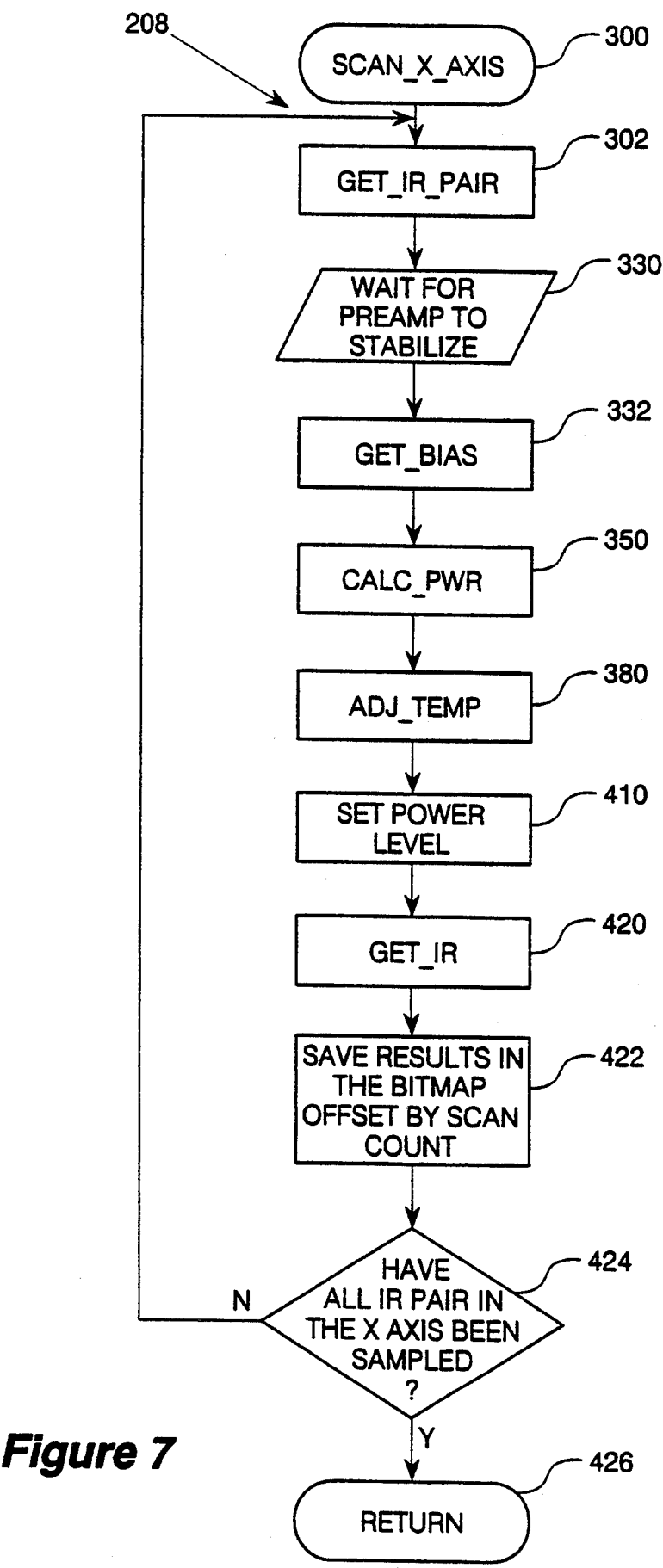
FIG. 7 is a schematic of the software used in the system of FIG. 2 to scan the X-axis of the touch screen display.
Figure 8:
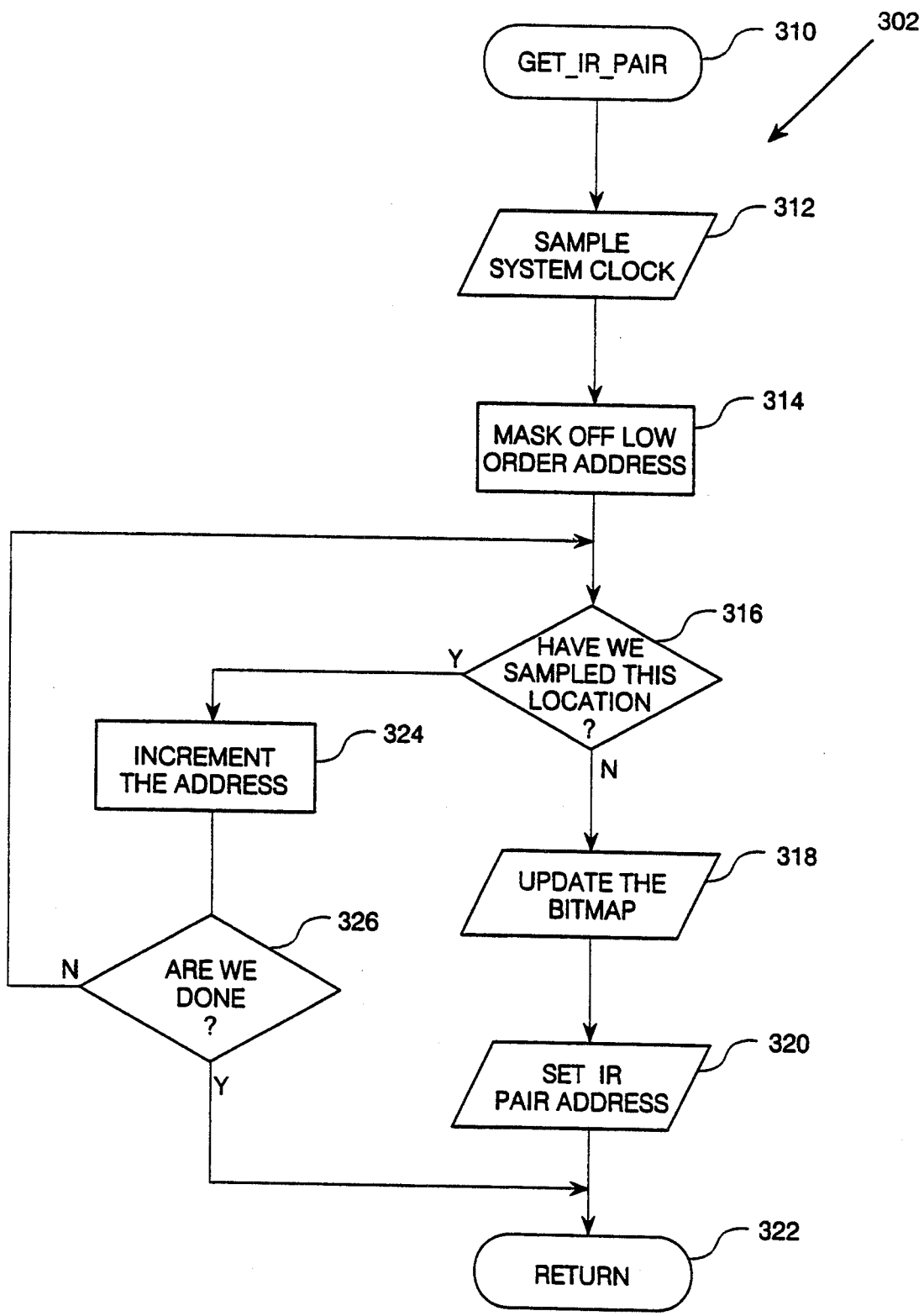
FIG. 8 is a flow chart of the software used to select each light emitter/detector pair during scanning.
Figure 9:
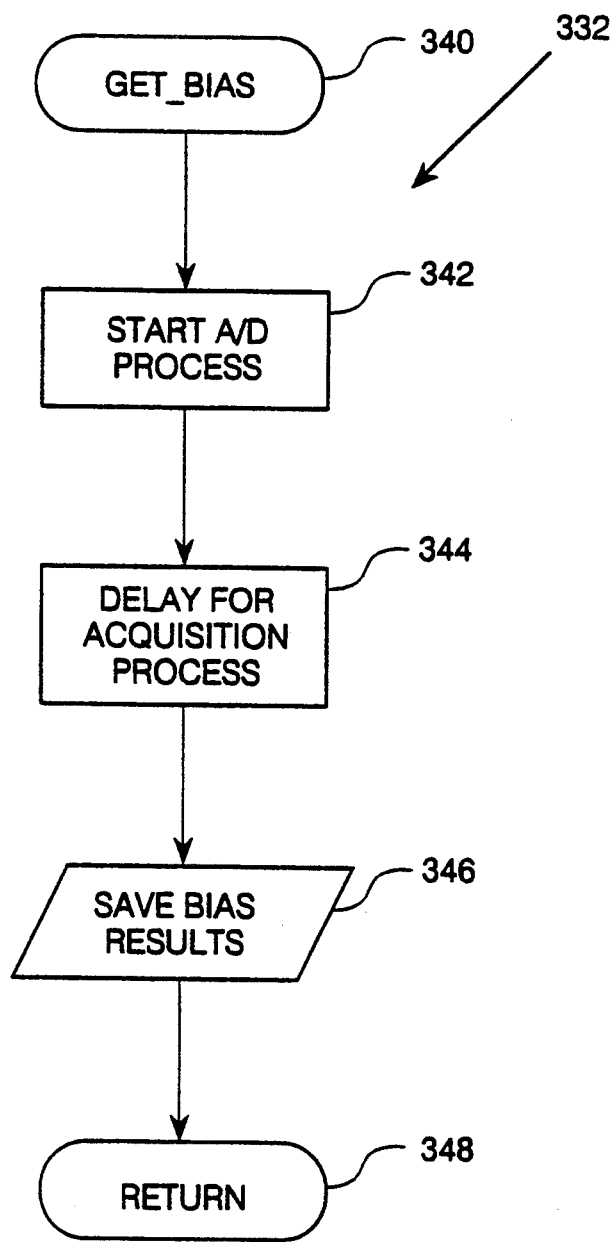
FIG. 9 is a flow chart of a subroutine used to sample the intensity of ambient light.
Figure 10:
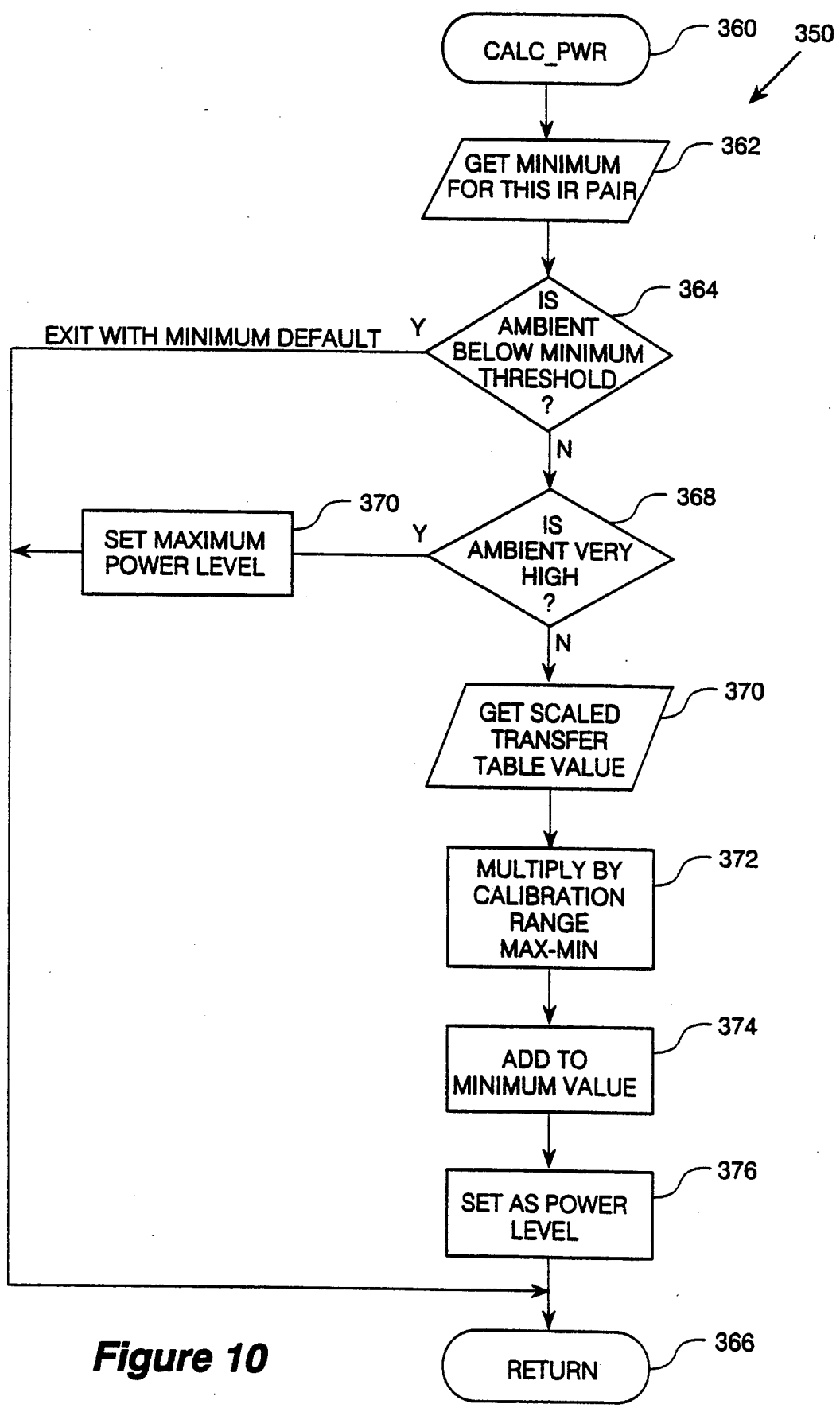
FIG. 10 is a flow chart of the software used to calculate the desired intensity of light generated by the light emitters.
Figure 11:
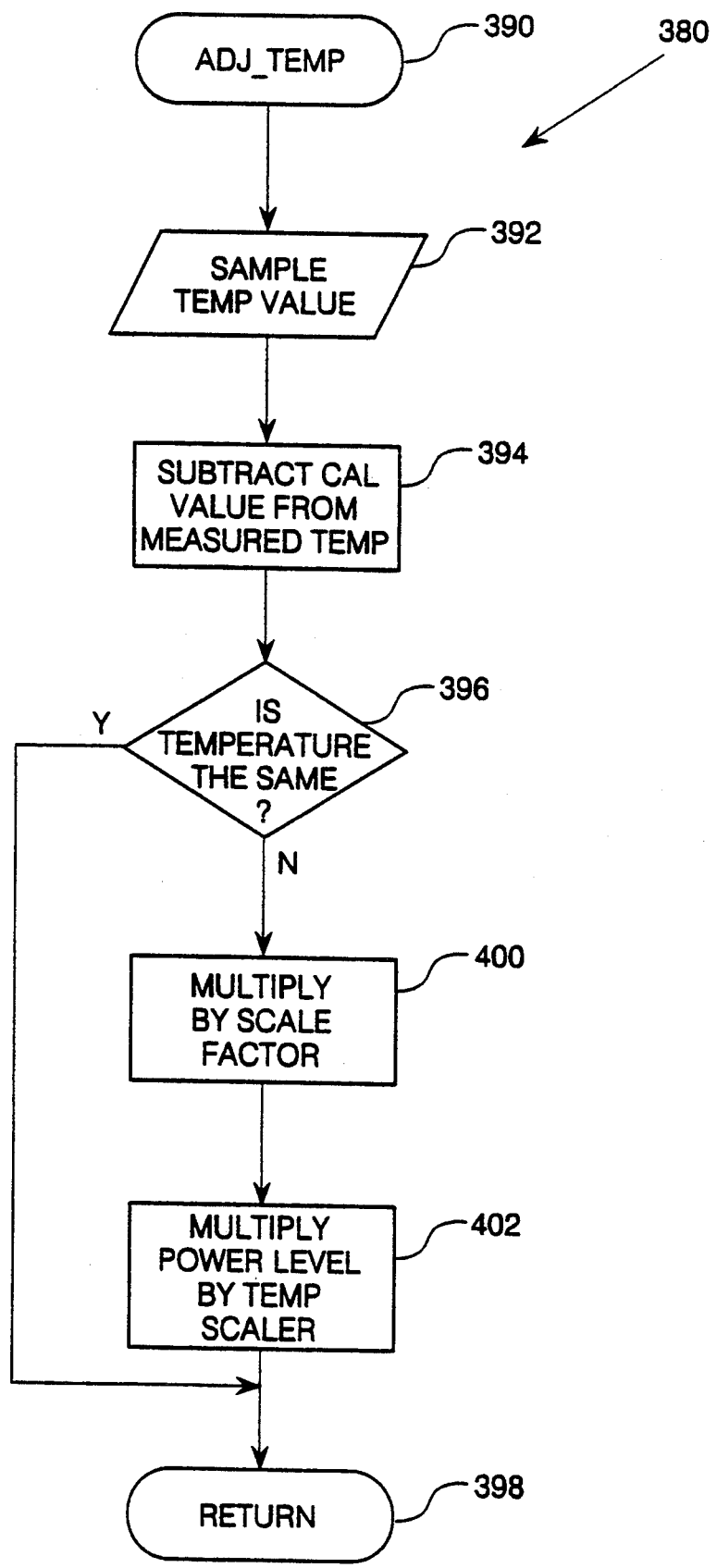
FIG. 11 is a flow chart of the software for adjusting the intensity of light generated by the light emitters as a function of ambient temperature.

After the desired emitter intensity is calculated, the subroutine once again returns to the "SCAN X-AXIS" subroutine 208 in FIG. 7. An "ADJ-TEMP" subroutine is then called at 380. The "ADJ-TEMP" subroutine 380, which is illustrated in FIG. 11, is entered at 390 and the output of the temperature transducer 68 (FIG. 2) is sampled at 392. The difference between the current ambient temperature and the ambient temperature during calibration is then determined at 394. If the current temperature at 396 to be the same at the ambient temperature during calibration, the subroutine returns to the "SCAN X-AXIS" subroutine 208 via 398. Otherwise, the difference in temperature is multiplied by an appropriate scale factor at 400 and the emitter intensity value calculated at 350 is multiplied by the scale factor at 402. In this manner, the "ADJ-TEMP" subroutine 380 adjusts the desired emitter intensity as a function of ambient temperature.

Returning, once again, to FIG. 7, the "SCAN X-AXIS" subroutine then sets the power level corresponding to the emitter intensity at 410 by applying a byte to digital-to-analog converter 42 (FIG. 2) indicating the desired power level. A "GET IR" subroutine is then called at 420 to trigger the one-shot 46 (FIG. 2) and apply appropriate bits to the emitter selector 40 and detector selector 60.

Figure 12:
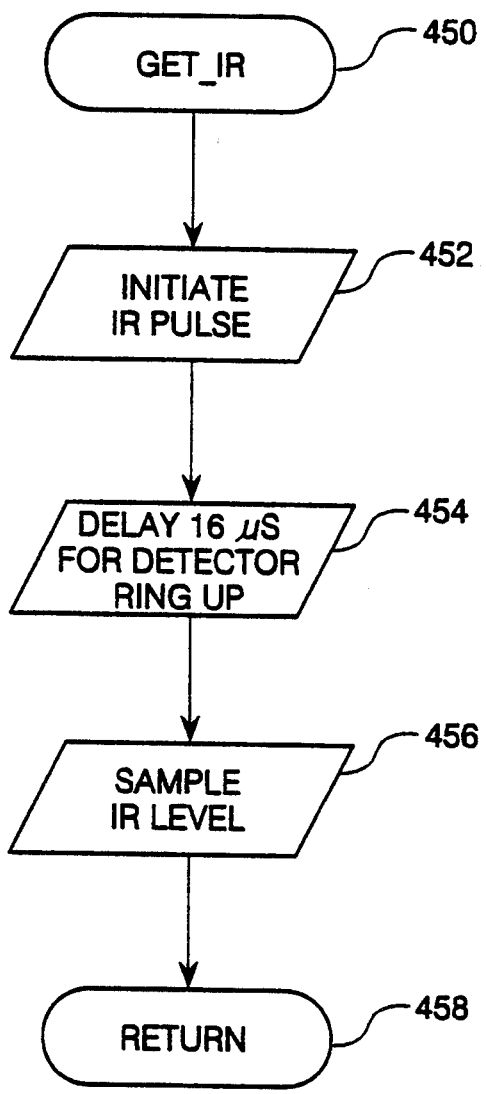
FIG. 12 is a flow chart of the software used in the system of FIG. 2 to illuminate a selected light emitter and sample the corresponding light detector.

The "GET IR" subroutine 410 is illustrated in detail in FIG. 12. The "get IR" subroutine is entered at 450 and the digital one-shot 46 (FIG. 2) is then triggered by a pulse at the output of the microprocessor 36 at 452. The program delays an appropriate period at 454, such as 16 microseconds, to allow the detector circuitry to stabilize before sampling the output of the high pass filter 64 at 456 to determine whether the emitted light is being received at the associated detector. The program then returns to the "SCAN X-AXIS" subroutine through 458.

After the "GET IR" subroutine has been completed, the results of the test are then saved in a bitmap at 422, as illustrated in FIG. 7. The bitmap is a table having a location for each emitter/detector pair for each scan of the keyboard. Thus, a touch screen keyboard having 64 emitter/detector pairs along the x-axis will have 192 memory locations if the keyboard is to be scanned three times. The subroutine determines at 324 if all of the emitter/detector pairs have been scanned. If not, the subroutine returns to 302 to once again perform the "GET IR PAIR" subroutine. After all of the emitter/detector pairs have been scanned, the subroutine returns through 426 to the main loop program at 210 (FIG. 6).

Figure 13:
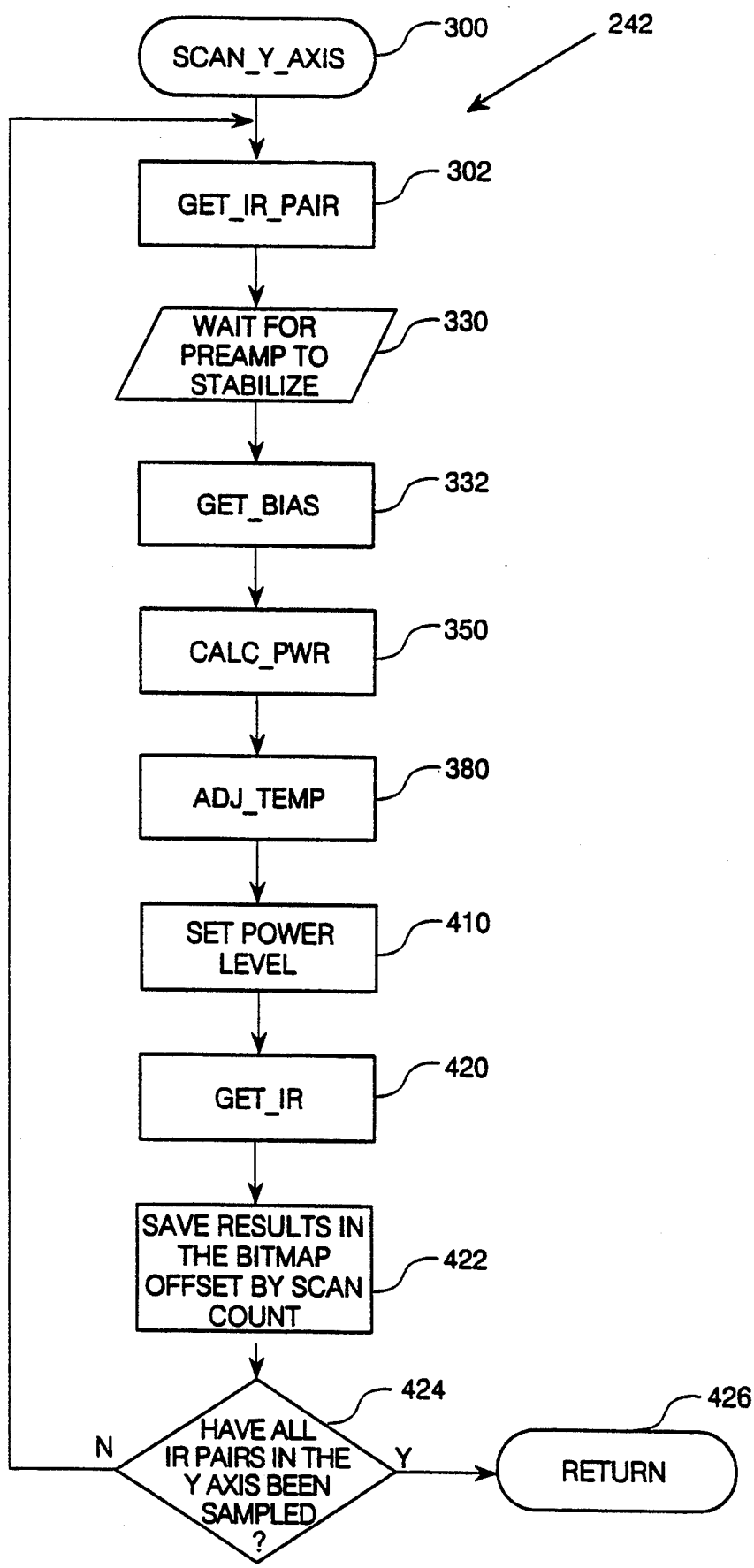
FIG. 13 is a flow chart of the software used in the system of FIG. 2 to scan the Y-axis of the touch screen display.

As explained above with respect to the main loop program, after the "SCAN X-AXIS" subroutine is performed to identify the "x" location of an obscured emitter/detector pair, the main loop program calls at 242 a "SCAN Y-AXIS" subroutine. The "SCAN Y-AXIS" subroutine, which is illustrated in FIG. 13, calls the same subroutines and performs essentially the same function as the "check y" subroutine. Therefore, in the interest of brevity, it will not be separately explained but instead the flow chart has been assigned the same reference numerals as the corresponding functions of the "SCAN X-AXIS" subroutine of FIG. 7.

Figure 14:
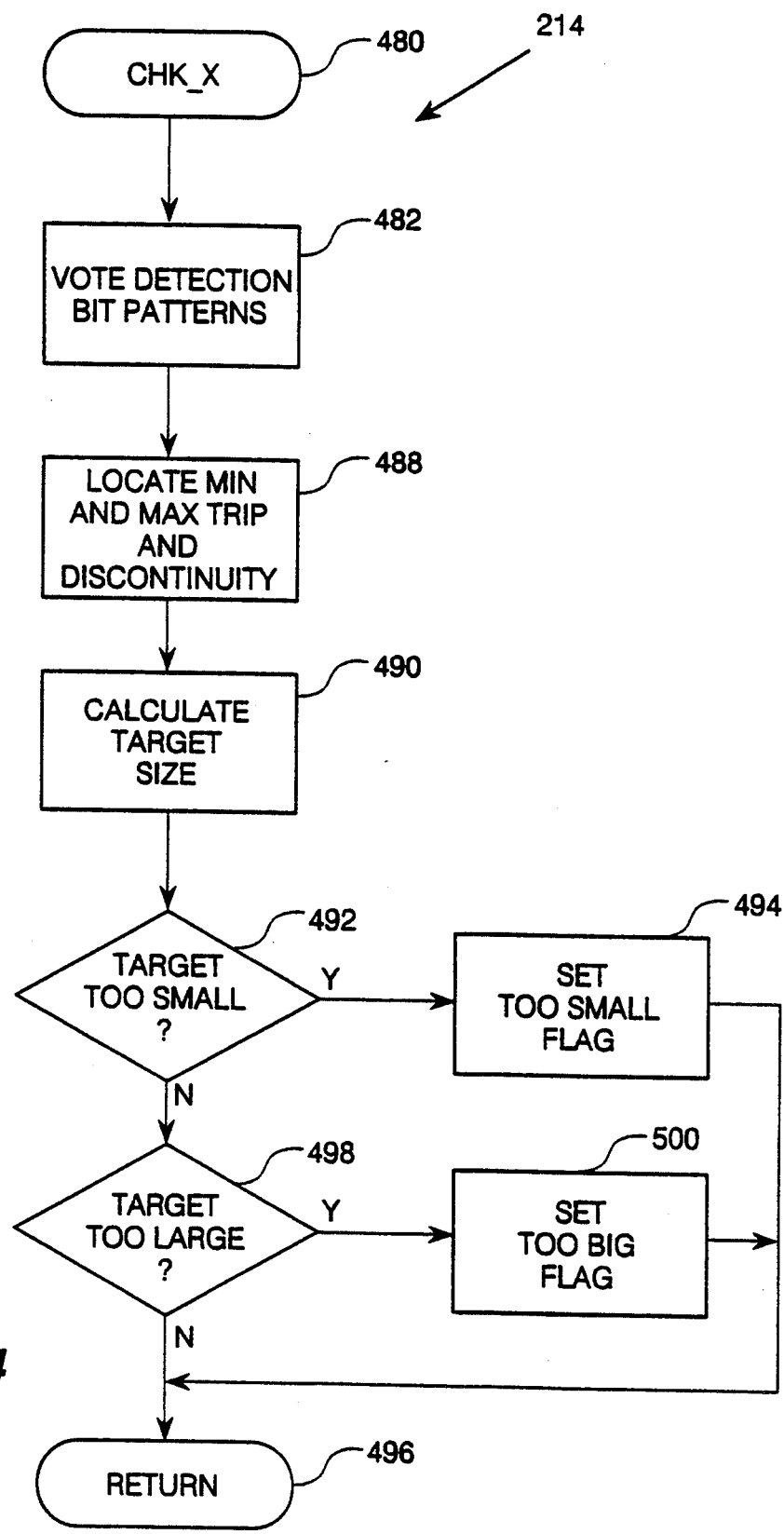
FIG. 14 is a flow chart of the software used to determine the X-axis position of a selected key.

The final subroutine executed by the main loop program of FIG. 6 is the "CHK X" subroutine 214 which is illustrated in FIG. 14. The "CHK X" subroutine 214 is entered at 480. It will be recalled that the "SCAN X" subroutine saves a bitmap of obscured light beams for several scans at 422. This bitmap is examined at 482 to identify light emitters/light detector pairs that are to be considered as obscured using an appropriate voting format. For example, if the x-axis light emitters/detectors are scanned three times, the bitmap created during the "SCAN X" subroutine will contain three bits for each light emitter/detector pair. The subroutine identifies a light emitter/detector pair as being selected if the light beam from the emitter to the detector has been obscured in any two of the three scans. Consequently, if during one of the scans light from an emitter has reflected on to the associated detector, that reflection will be ignored and a valid key selection will be recorded.

After the obscured beams have been identified at 482, the subroutine determines the right-most and left-most obscured beams at 488 and then calculates the target size at 490 based upon the number of beams obscured and the spacing between the beams. The calculated target size is then compared to a predetermined minimum target size at 492. If the target size is too small, such as a single beam is obscured, then an identifying flag is set at 494 and the subroutine returns to the main loop program through 496. If the target is not too small, the subroutine branches to 498 where the calculated target size is compared to a predetermined large value. If the target is too large, such as would occur if the screen 12 (FIG. 1) was being cleaned by a cloth, an appropriate flag is set at 500 before returning through 496.

Figure 15:
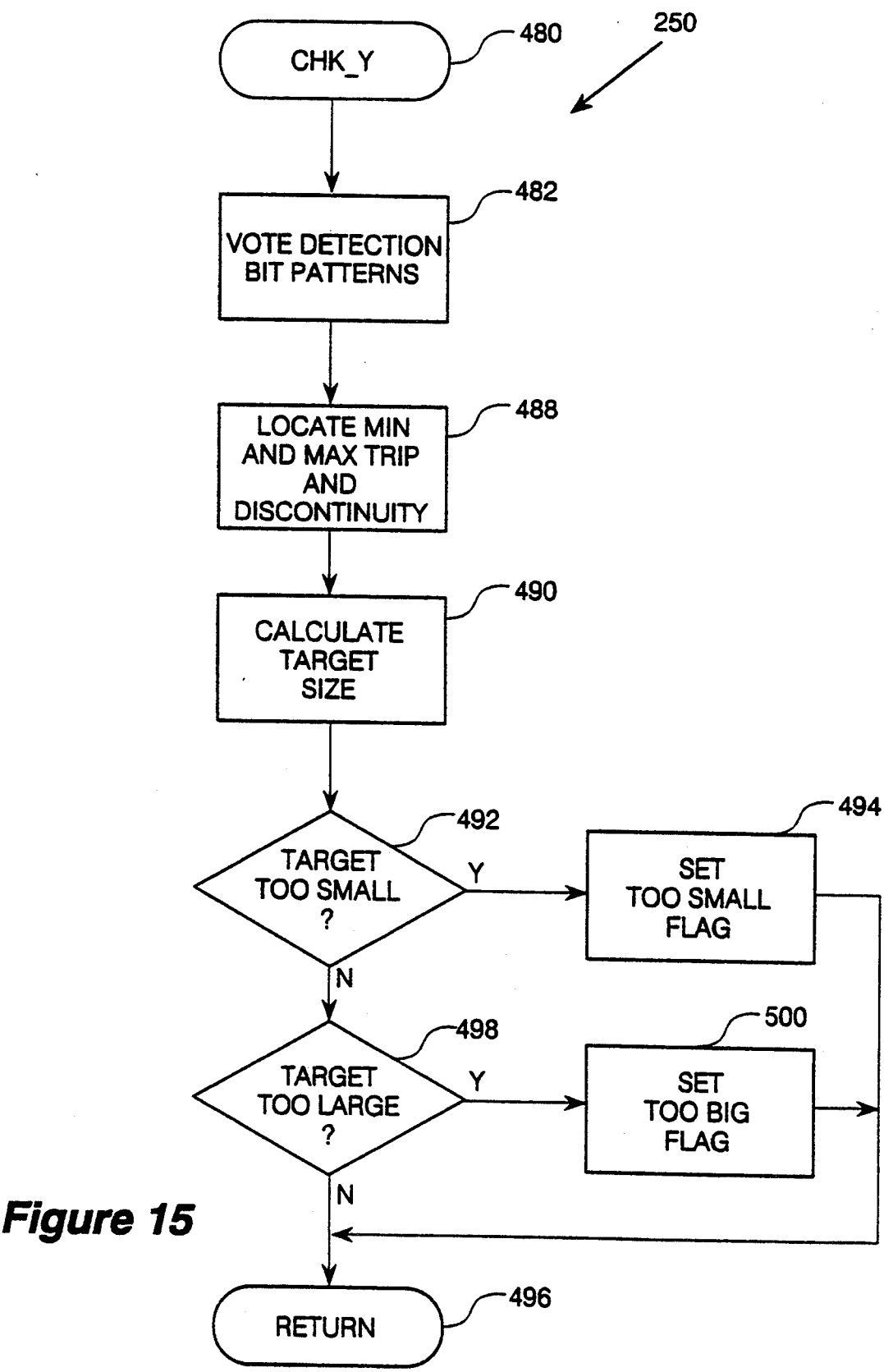
FIG. 15 is a flow chart of the software used to determine the Y-axis position of a selected key.

With reference to the main loop program of FIG. 6, after the "CHK X" subroutine in 214 is executed, the program eventually progresses to a "CHKY" subroutine which is executed at 252. The "CHKY" subroutine 250 is illustrated in FIG. 15. The "CHKY" subroutine is identical to the "CHK X" subroutine, except that it performs its function for the y-axis light emitter/detectors rather than the x-axis light emitter/detectors. Therefore, in the interest of brevity, it has been given the same reference numerals for the corresponding functions.

The inventive touch screen keyboard is thus insensitive to ambient light interference, even from touch screen displays having identical scan patterns, and it is insensitive to reflections of emitted beams from touch screen components. It also compensates for the effect of changes in ambient light, temperature, component aging and environmental variations without overdriving the light emitters. Furthermore, the inventive touch screen keyboard does not require close matching of the electrical characteristics of electrical components in order to provide uniform performance.

I claim:

1. A touch screen keyboard system for a display panel, comprising:

a plurality of spaced-apart light emitters positioned along at least one edge of said display panel;

a plurality of spaced-apart light detectors positioned along an edge of said display panel opposite said light emitters;

power means for selectively energizing each of said light emitters in response to an activation signal applied to each of said light emitters;

detector means for enabling an output form at least one predetermined light detector while a respective light emitter is being energized, and for determining whether light from the energized light emitter is being received by said enabled light detector; and control means for generating a pseudo random activation signal for each of said light emitters thereby energizing said light emitters in the pseudo random manner to reduce the probability that an external light source operating in close proximity will operate in synchronism and thus interfere with said touch screen.

2. The touch screen keyboard system of claim 1 wherein said display panel is rectangular, and wherein said light emitters are positioned along two adjacent edges of said panel, and said light detectors are positioned along the two remaining edges of said panel.

3. The touch screen keyboard system of claim 1 wherein only one of said light detectors is enabled while a respective light emitter is being energized.

4. The touch screen keyboard system of claim 3 wherein each of said light emitters is positioned opposite a corresponding one of said light detectors, and wherein the light detector corresponding to a respective light emitter is enabled while said light emitter is energized.

5. A touch screen keyboard system for a display panel, comprising:

a plurality of spaced-apart light emitters positioned along at least one edge of said display panel to form part of said touch screen keyboard system;

a plurality of spaced-apart light detectors positioned along an edge of said display panel opposite said light emitters to form part of said touch screen keyboard system;

power control means for selectively energizing each of said light emitters in response to an activation signal applied to each of said light emitters, said power control means energizing each of said light emitters at an intensity corresponding to a respective intensity control signal;

detector means for enabling an output from at least one predetermined light detector while a respective light emitter is being energized, and for determining whether light from the energized light emitter is being received by said light detector; and compensation means for generating each of said intensity control signals as a function of the intensity of ambient light so that the intensity of light emitted by said light emitters is a function of the intensity of ambient light.

6. The touch screen keyboard system of claim 5 wherein said system further includes a temperature sensor for generating a temperature signal indicative of the temperature of ambient temperature, and wherein said compensation means receives said temperature signal and adjusts said intensity control signals as a function of the ambient temperature indicated by said temperature signal.

7. The touch screen keyboard system of claim 5 wherein said ambient light is measured by at least one of said light detectors, and wherein each of said light detectors is enabled before and after a respective light emitter is being energized.

8. The touch screen keyboard system of claim 5 wherein said power control means comprise voltage to current converting means connected in series with each of said light emitters, said voltage to current converting means receiving said intensity control signals and causing current to flow through said light emitters as a function of the magnitude of said intensity control signals upon receipt of said activation signal.

9. The touch screen keyboard system of claim 8 wherein said compensation means comprise:
 a processor having a first I/O port receiving data indicative of the intensity of ambient light, and a second I/O port outputting data indicative of the magnitude of said intensity control signal;
 a digital-to-analog converter connected to the second I/O port of said processor, said digital-to-analog converter generating at an output said intensity control signal having a magnitude corresponding to the data output from the second I/O port of said processor; and
 a multiplexer connected between said digital-to-analog converter and said power control means, said multiplexer being controlled by said processor to selectively apply the output of said digital-to-analog converter to the power control means for each of said light emitters.

10. The touch screen keyboard system of claim 5 wherein said compensation means for generating each of said intensity control signals comprises:
 a processor receiving data indicative of the intensity of ambient light and generating a first digital word indicative of the desired intensity of light to be emitted by said light emitters; and
 a digital-to-analog converter connected to said processor, said digital-to-analog converter receiving said first digital word and generating at an output an analog signal corresponding thereto from which said intensity control signals are generated.

11. The touch screen keyboard system of claim 10 further including a multiplexer having an input and a plurality of outputs that are selectively connected to said input responsive to a second digital word, the input of said multiplexer being connected to the output of said digital-to-analog converter to receive said analog signal therefrom, the outputs of said multiplexer being connected to said power control means, and said second digital word being received from said processor so that said multiplexer outputs said intensity control signals to control the intensity of light emitted by respective of said light emitters.

12. The touch screen keyboard system of claim 10 wherein said compensation means further includes a one-shot for gating said intensity control signals to said power control means for a predetermined duration.

13. The touch screen keyboard system of claim 12 wherein said one-shot comprises:
 a counter having a reset input receiving an enable input from said processor, a clock input, and a multibit output generated on respective output terminals for providing a digital word indicative of the count of said counter; and
 a first gate having an output coupled to the clock input of said counter, said first gate having a first input receiving a clock signal, and a second input receiving a disable signal from a first output of said counter so that said first gate is disabled when the logic level of said first output changes thereby preventing said clock signal from reaching the clock input of said counter whereby said counter is incremented by said clock signal upon receipt of said enable signal until the logic level of the signal on said first output changes state thereby preventing said clock signal from continuing to increment said counter, whereby said first output of said counter is used to gate said intensity control signals to said power control means for a predetermined duration.

14. A touch screen keyboard system for a display panel, comprising:
 a plurality of spaced-apart light emitters positioned along at least one edge of said display panel;
 a plurality of spaced-apart light detectors positioned along an edge of said display panel opposite said light emitters;
 power means for selectively energizing each of said light emitters in response to an activation signal applied to each of said light emitters;
 detector means for enabling at least one predetermined light detector while a respective light emitter is being energized, and for determining whether light from the energized light emitter is being received by said enabled light detector;
 control means for straining said light emitter/light detector pairs by generating an activation signal for each of said light emitters;
 memory means connected to said detector means to record whether light from each of said light emitters is being received by a respective light detector during a predetermined number of scans of said light emitter/light detector pairs; and
 processing means operatively connected to said memory means for providing an indication that an area of said display panel corresponding to a predetermined light emitter/light detector pair has been activated only if light from the light emitter in said pair has not been received by the respective light detector in said pair during a plurality of successive scans of said light emitter/light detector pairs.

15. A method of scanning a touch screen keyboard system having a plurality of spaced-apart light emitters positioned along at least one edge of a display panel and a plurality of spaced-apart light detectors positioned along an edge of said display panel opposite said light emitters, said method comprising:

pseudo randomly energizing each of said light emitters, and determining if light from each energized light emitters is being received by a corresponding light detector so that the probability that a plurality of touch screen keyboard systems operating in close proximity will operate in synchronism and thus interfere with each other is reduced.

16. The method of claim 15 wherein each of said light emitters is positioned opposite a corresponding one of said light detectors, and wherein the light detector corresponding to a respective light emitter is enabled when said light emitter is energized.

17. A method of scanning a touch screen keyboard system having a plurality of spaced-apart light emitters positioned along at least one edge of a display panel and a plurality of spaced-apart light detectors positioned along an edge of said display panel opposite said light emitters, said method comprising:

selectively energizing each of said light emitters at an intensity that is a function of the intensity of ambient light;

enabling an output from at least one predetermined light detector while a respective light emitter is being energized; and determining whether light from the energized light emitter is being received by said enabled light detector.

18. The method of claim 17 further including the steps of:

determining the ambient temperature of said touch screen; and further adjusting the intensity at which said light emitters are energized as a function of the ambient temperature.

19. A method of scanning a touch screen keyboard system having a plurality of spaced-apart light emitters positioned along at least one edge of a display panel and a plurality of spaced-apart light detectors positioned along an edge of said display panel opposite said light emitters, said method comprising:

selectively energizing each of said light emitters;

enabling an output from at least one predetermined light detector while a respective light emitter is being energized;

determining whether light from the energized light emitter is being received by said enabled light detector;

recording whether light from each of said light emitters is being received by a respective light detector during a predetermined number of scans of said light emitter/light detector pairs; and providing an indication that an area of said display panel corresponding to a predetermined light emitter/light detector pair has been activated only if light from the light emitter in said pair has not been received by the respective light detector in said pair during a plurality of successive scans of said light emitter/light detector pairs.

* * * * *

UNITED STATES PATENT AND TRADEMARK OFFICE
CERTIFICATE OF CORRECTION

PATENT NO. : 5,355,149
DATED      : October 11, 1994
INVENTOR(S) : Mark W. Casebolt It is certified that error appears in the above-indentified patent and that said Letters Patent is hereby corrected as shown below:

Column 16, claim 14, line 49, delete "straining" and substitute therefor --scanning--.

Signed and Sealed this

Twenty-first Day of February, 1995

BRUCE LEHMAN

*Attest:*

*Attesting Officer*   *Commissioner of Patents and Trademarks*